(12) United States Patent
Zhou et al.

(10) Patent No.: US 8,740,227 B2
(45) Date of Patent: Jun. 3, 2014

(54) FORCE INCREASING SELF-LOCKING DRILL CHUCK AND SELF-LOCKING MECHANISM THEREOF

(75) Inventors: Zexin Zhou, Shanghai (CN); Guijie Li, Weihai (CN)

(73) Assignee: Shandong Weida Machinery Co., Ltd., Wendeng, Shandong Province (CN)

( * ) Notice: Subject to any disclaimer, the term of this patent is extended or adjusted under 35 U.S.C. 154(b) by 1165 days.

(21) Appl. No.: 12/689,278

(22) Filed: Jan. 19, 2010

(65) Prior Publication Data

US 2010/0181735 A1  Jul. 22, 2010

(30) Foreign Application Priority Data

Jan. 19, 2009 (CN) .......................... 2009 1 0005452
Sep. 1, 2009 (CN) .......................... 2009 1 0172068

(51) Int. Cl.
*B23B 31/12* (2006.01)
*B23B 31/165* (2006.01)

(52) U.S. Cl.
USPC .............................. 279/62; 279/140; 279/902

(58) Field of Classification Search
USPC ........ 279/60, 61, 62, 63, 64, 65, 66, 140, 902
See application file for complete search history.

(56) References Cited

U.S. PATENT DOCUMENTS

| | | | | |
|---|---|---|---|---|
| 5,172,923 A * | 12/1992 | Nakamura | ......................... | 279/62 |
| 5,322,303 A * | 6/1994 | Nakamura | ......................... | 279/62 |
| 5,330,204 A * | 7/1994 | Huff et al. | ......................... | 279/62 |
| 5,499,829 A * | 3/1996 | Rohm | ............................. | 279/62 |
| 5,775,704 A | 7/1998 | Wilson et al. | | |
| 5,829,761 A | 11/1998 | Röhm | | |
| 5,957,469 A * | 9/1999 | Miles et al. | ...................... | 279/62 |
| 6,390,481 B1 | 5/2002 | Nakamuro | | |
| 7,063,201 B2 * | 6/2006 | Nakamura et al. | ......... | 192/223.1 |
| 7,389,993 B2 * | 6/2008 | Rohm et al. | .................... | 279/62 |
| 7,527,273 B2 * | 5/2009 | Bordeianu | ....................... | 279/62 |
| 7,644,931 B2 * | 1/2010 | Mack | ............................... | 279/62 |
| 8,387,995 B2 * | 3/2013 | Bordeianu | ....................... | 279/62 |
| 2002/0000698 A1 * | 1/2002 | Rohm | ............................. | 279/62 |
| 2003/0137113 A1 * | 7/2003 | Sakamaki et al. | .............. | 279/62 |
| 2006/0055127 A1 * | 3/2006 | Rohm et al. | .................... | 279/62 |
| 2010/0127463 A1 * | 5/2010 | Zhou et al. | ....................... | 279/61 |

FOREIGN PATENT DOCUMENTS

DE          699 14 918 T2   12/2004

* cited by examiner

*Primary Examiner* — Eric A Gates
*Assistant Examiner* — Paul M Janeski
(74) *Attorney, Agent, or Firm* — Fay Sharpe LLP

(57) ABSTRACT

The present invention discloses a self-locking mechanism for use in a drill chuck, comprising: clutch tooth sleeves, fixedly connected with the chuck body of the drill chuck and forming teeth; an oval deformation ring, having a substantially circular first shape and a substantially oval second shape, wherein the oval deformation ring has teeth on the side wall, with the teeth engaging with the teeth of the clutch tooth sleeve when the oval deformation ring is in the second shape; and a control sleeve, for controlling the conversion of the oval deformation sleeve between the first shape and the second shape. The present invention also discloses a force increasing self-locking drill chuck with said self-locking mechanism. The self-locking mechanism according to the present invention can be used in drill chucks of multiple structures, and provides a brand-new thought for the designs of the self-locking mechanisms of drill chucks.

3 Claims, 21 Drawing Sheets

US 8,740,227 B2

FORCE INCREASING SELF-LOCKING DRILL CHUCK AND SELF-LOCKING MECHANISM THEREOF

FIELD OF THE INVENTION

The present invention relates to a drill chuck, and also relates to a self-locking mechanism for drill chucks.

BACKGROUND OF THE INVENTION

Current drill chucks generally consist of a drill body, jaws, a nut, a bearing and a coat, wherein the drill body is connected with a transmission shaft of a power source, three jaws are respectively mounted within three equally distributed slanting holes in the drill body, the jaws have threads thereon which form thread transmission with the nut, and when the coat connected with the nut is rotated, the jaws can move along the slanting holes with respect to the drill body, thereby clamping or loosening a tool handle.

For the drill chucks of the above structure, as the threads between the jaws and the nut produce great contact stress under working load, which renders great friction from relative sliding, the clamping force for clamping a tool handle created by the thread transmission between the nut and the jaws is not large enough, which results in that the jaws cannot firmly clamp the tool handle under the operation condition of large load and vibration, and thus there exists a hidden trouble of looseness.

To improve the clamping property of the drill chucks and avoid loosening of the jaws during operation, there exist multiple known ratchet wheel pawl self-locking mechanisms, which aim to prevent loosening of the jaws.

U.S. Pat. No. 5,829,761 discloses a drill chuck comprising a self-locking mechanism (a locking system), wherein the basic member of this self-locking mechanism is a spring-steel member (a spring-steel entrainment element), and the spring-steel member is formed at the end with pawls which can engage with ratchets arranged along the outer circumference of the drill body, so that the spring-steel member can only rotate in one direction with respect to the drill body, thereby forming self-locking.

U.S. Pat. No. 6,390,481 discloses a drill chuck, comprising a chuck body, multiple jaws, a sleeve driving the multiple jaws, and a bearing element, wherein a first race of the bearing defines one ratchet wheel, and a second race defines pawls which can engage with the ratchet wheel. The mutual engagement between the pawls and the ratchet wheel can form self-locking.

However, the inventors of the present invention note that in the above drill chucks, adopting the common ratchet wheel pawl self-locking mechanism will bring trouble to the overall design of the drill chucks, including, but not limited to, that using the common ratchet wheel pawl self-locking mechanism will render the structural design of the drill chuck unreasonable or render it unable to be used in the design of the drill chucks.

SUMMARY OF THE INVENTION

The present invention aims to provide a new self-locking mechanism for use in drill chucks, and also aims to provide a drill chuck having the self-locking mechanism.

Therefore, on the one hand, the present invention provides a self-locking mechanism for use in drill chucks, comprising: clutch tooth sleeves, fixedly connected with the chuck body of the drill chuck and forming teeth; an oval deformation ring, having a substantially circular first shape and a substantially oval second shape, wherein the oval deformation ring has teeth on the side wall, with the teeth engaging with the teeth of the clutch tooth sleeve when the oval deformation ring is in the second shape; and a control sleeve, for controlling the conversion of the oval deformation sleeve between the first shape and the second shape.

In the present invention, the teeth on the oval deformation ring can be formed on the outer side wall to form outer teeth, and can also be formed on the inner side wall to form inner teeth.

Preferably, the oval deformation ring mentioned above includes a control portion for pressing the side wall of the oval deformation ring, and the oval deformation ring includes a restoration groove in the side wall for receiving the control portion of the control sleeve.

Preferably, the self-locking mechanism mentioned above further comprises a restricting mechanism, for restricting the relative rotation angle between the oval deformation ring and the control sleeve.

Preferably, the restricting mechanism mentioned above is a positioning portion provided on the oval deformation ring.

Preferably, the restricting mechanism mentioned above is a groove side wall provided in the inner wall of a coat of the drill chuck, wherein the key of the oval deformation ring is restricted in the groove side wall.

Preferably, the control sleeve mentioned above is provided thereon with a protrusion for holding the oval deformation ring in the first shape.

On the other hand, the present invention provides a drill chuck, comprising: a chuck body, comprising therein multiple equally distributed slanting holes along the circumference; multiple jaws, slideably provided within the slanting holes of the chuck body and having threads at the rear end; a split-body nut, rotatably provided outside the chuck body and joining the threads of the jaws; a nut sleeve, closely put around the split-body nut; a coat, rotatably put around the chuck body, formed with a handling portion at the outer surface, and providing a rotating driving force to the nut sleeve; and the above mentioned self-locking mechanism, wherein the oval deformation ring of the self-locking mechanism rotates synchronously with the nut sleeve or a force increasing mechanism of the nut sleeve.

Preferably, the oval deformation ring is fixedly connected to the nut sleeve of the drill chuck. Or, the oval deformation ring is formed integrally with the nut sleeve of the drill chuck.

Preferably, the oval deformation ring is connected to the lower end of the nut sleeve (2) of the drill chuck synchronously rotatably.

Preferably, the body of the nut sleeve is provided at the lower end with a hook key extending inward radially and extension wall portions with key grooves provided therein; and the oval deformation ring is provided at the ring body with a hook key positioning groove and a key extending outward; wherein the hook key of the nut sleeve engages with the hook key positioning groove of the oval deformation ring, and the key of the oval deformation ring engages with the key groove of the nut sleeve. More preferably, under the hook key positioning groove in the ring body of the oval deformation ring is a material removal region.

Preferably, the force increasing mechanism is a lever force increasing mechanism.

Preferably, the lever force increasing mechanism comprises: a driving member, provided at the upper end of the nut sleeve and including at least one tooth groove; a force bearing member, provided at the lower end of the nut sleeve, and including at least one tooth groove and a clutch control portion engaging with the positioning groove in the nut sleeve; and a lever, with a force applying end at its upper end engaging with the tooth groove of the driving member and a fulcrum end at its lower end engaging with the tooth groove of the force bearing member, and a force applied portion being rotatably assembled on a driving portion of the nut sleeve, wherein, the clutch control portion of the force bearing member engages with inner teeth of the clutch tooth sleeve when disengaging from the positioning groove, and the key of the driving member joins the key of the oval deformation ring and is located between the groove side walls of the coat.

Preferably, the oval deformation ring mentioned above comprises an upper ring portion and a lower ring portion connected together via several connecting portions, wherein the upper ring portion is formed with a key thereon, and the lower ring portion is formed at the outer circumference with the restoration groove, outer teeth engaging with the clutch tooth sleeve, and the positioning portion for restricting the control portion of the control sleeve.

In addition, the present invention further provides a drill chuck, comprising: a chuck body, including therein multiple equally distributed slanting holes along the circumference; multiple jaws, slideably provided within the slanting holes of the chuck body and having threads at the rear end; a split-body nut, rotatably provided around the chuck body and joining the threads of the jaws; a nut sleeve, closely put around the split-body nut; a connecting sleeve, rotatably assembled within a connecting hole of the chuck body and connected with a driving shaft of a power machine; and the above mentioned self-locking mechanism, wherein the clutch tooth sleeve of the self-locking mechanism is formed with a handling portion at the outer surface, and the control sleeve comprises a handling portion located between the clutch tooth sleeve and the connecting sleeve; and an intermediate sleeve, rotating synchronously with the connecting sleeve and connected fixedly with the rear portion of the oval deformation ring.

Preferably, the self-locking drill chuck mentioned above further comprises a friction ring, rotatably assembled between a bearing of the split-body nut and a support stand of the chuck body.

Preferably, the oval deformation ring mentioned above is provided thereon with a driving jaw engaging with a tooth groove of the friction ring, and the friction ring includes a key side wall for defining the rotation angle of the driving key of the oval deformation ring.

The self-locking mechanism according to the present invention can be used in drill chucks of multiple structures, and provides a brand-new thought for the designs of the self-locking mechanisms of drill chucks.

Besides the above described objects, features and advantages, the present invention also has other objects, features and advantages. Said other objects, features and effects of the present invention will be further detailed hereinafter taken in conjunction with the accompanying drawings of the present invention.

DESCRIPTION OF THE ACCOMPANYING DRAWINGS

Accompanying drawings constituting a part of the Description for further understanding of the present invention illustrate preferred embodiments of the present invention and are used to explain the principle of the present invention together with the Description. In the accompanying drawings:

FIG. 8b is a top view of the force bearing member 3" shown in FIG. 8a;

DETAILED DESCRIPTION OF THE INVENTION

The embodiments of the present invention will be detailed hereinafter taken in conjunction with figures thereof. However, the present invention can be implemented by multiple different modes defined and covered by the claims.

The self-locking mechanism according to the present invention is preferably applied in drill chucks, and a drill chuck including the self-locking mechanism is now taken as an example for explanation.

The First Embodiment

Figure 1:
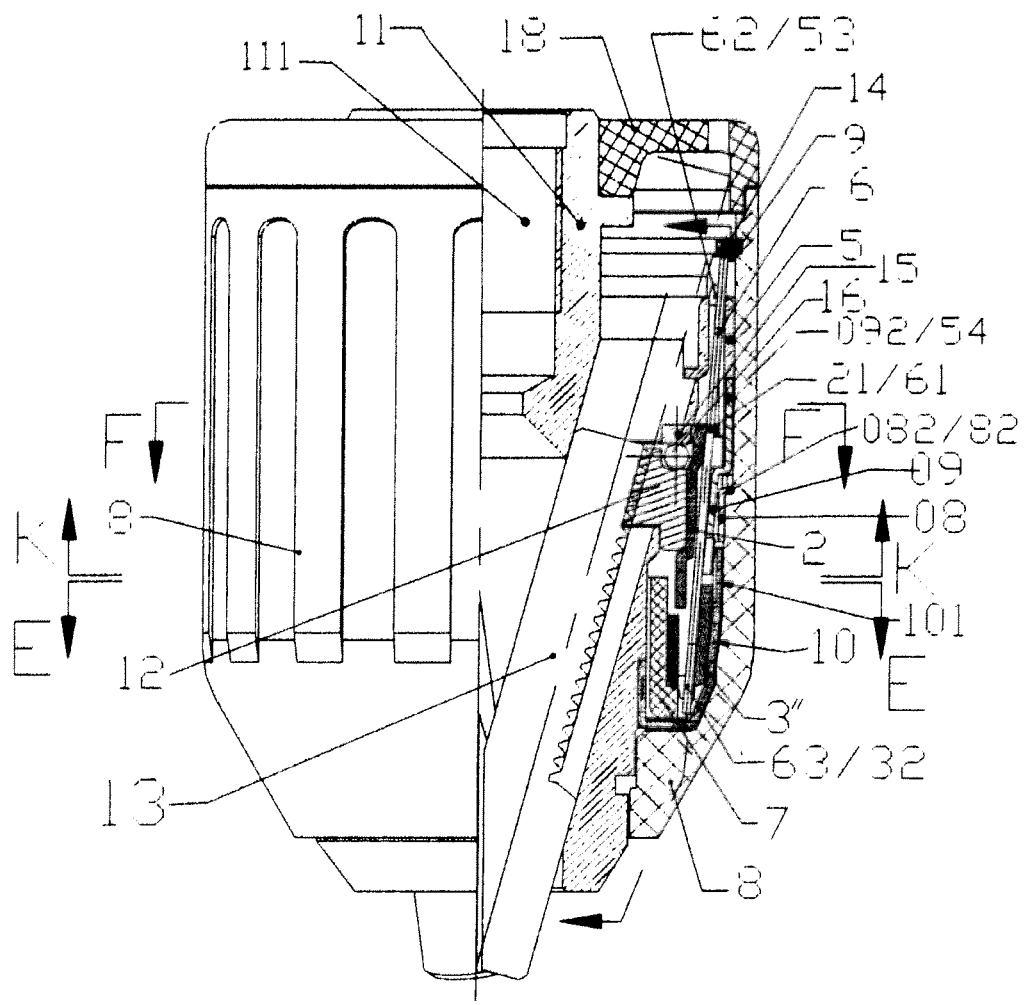
FIG. 1 is a front sectional view of the force increasing self-locking drill chuck according to the first embodiment of the present invention.

FIGS. 1 to 8b illustrate a force increasing self-locking drill chuck according to the first embodiment of the present invention. Wherein, the assembling of respective assemblies is described as follows:

as shown in FIG. 1, three jaws 13 are mounted within three slanting holes of the chuck body 11 forming an acute angle with respect to the base axis; two split-body nuts 12 are assembled on the chuck body 11 and engage with the threads of the three jaws, the split-body nuts and the outer nut sleeve 2 are assembled integrally by interference.

The rear cover 18 is fixedly mounted at the rear end of the chuck body 11, and the coat 8 is axially positioned on the chuck body via the clamp spring 14 and the washer 9. The clutch tooth sleeve 10 is fixed at the front end of the chuck body 11.

The driving member 5 is rotatably put around the chuck body 11, and the force bearing member 3" and the shaft sleeve 7 are also rotatably put around the chuck body 11.

Figure 2:
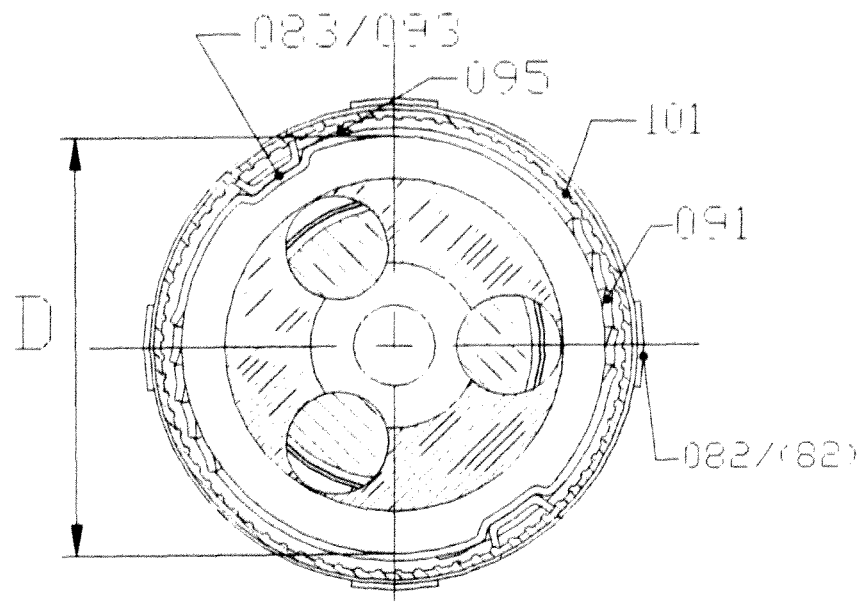
FIG. 2 is a sectional view of the force increasing self-locking drill chuck shown in FIG. 1 in a loosening state taken along line K-K, wherein, the nut sleeve, the lever, the force bearing member and the coat are removed.
Figure 4:
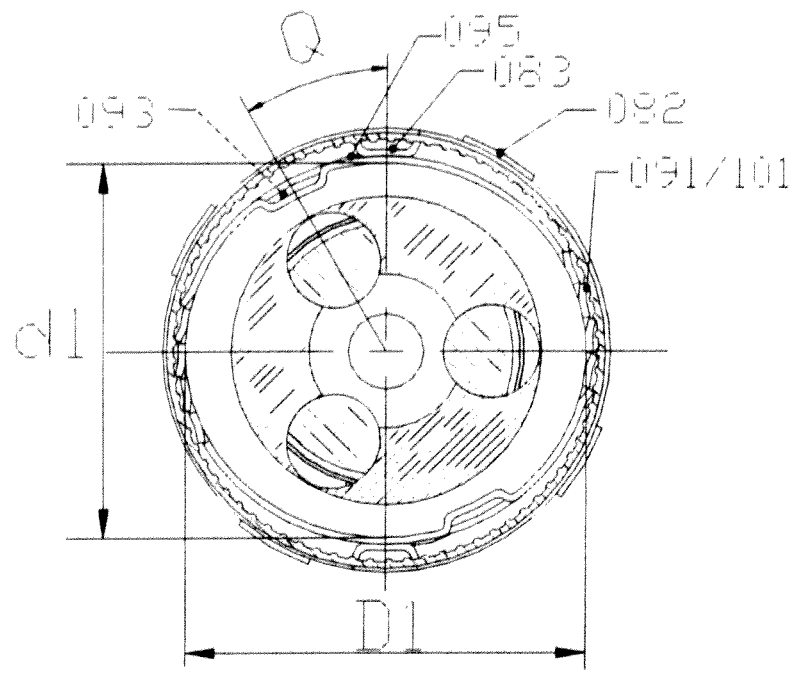
FIG. 4 is a sectional view of the force increasing self-locking drill chuck shown in FIG. 1 in a clamping state taken along line K-K, wherein, the nut sleeve, the lever, the force bearing member and the coat are removed.

As shown in FIGS. 1 and 2, the oval deformation ring 09 is put around between the control sleeve 08 and the nut sleeve 02, and the control portion 083 of the control sleeve 08 is located within the restoration groove 093 of the oval deformation ring 09. As shown in FIG. 4, the control sleeve 08 and the oval deformation ring 09 rotate by an angle Q with respect to each other, and the control portion 083 of the control sleeve 08 abuts against the outer wall of the oval deformation ring 09, so that the oval deformation ring changes from the original circular shape to the oval shape, and the teeth 091 located on the major axis side of the oval shape engages with the teeth 101 on the clutch tooth sleeve 10.

Figure 3:
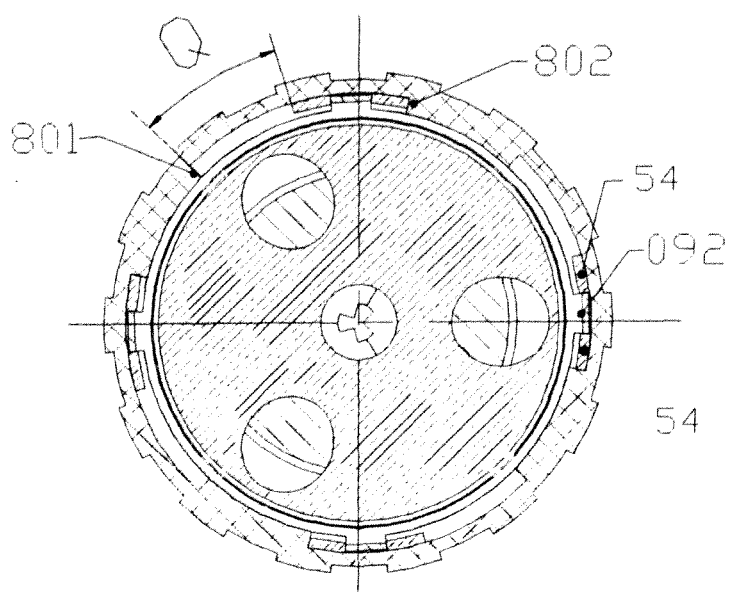
FIG. 3 is a sectional view of the force increasing self-locking drill chuck shown in FIG. 1 in a clamping state taken along line F-F, wherein, the lever is removed.

As shown in FIGS. 1 and 3, the key 092 on the oval deformation ring 09 is inserted between two keys 54 of the driving member 5 and rotates synchronously with the driving member 5 by the angle Q with respect to the coat 8, wherein the keys 54 of the driving member 5 and the key 092 of the oval deformation ring 09 move between the groove side walls 801 and 802 of the coat.

Figure 5:
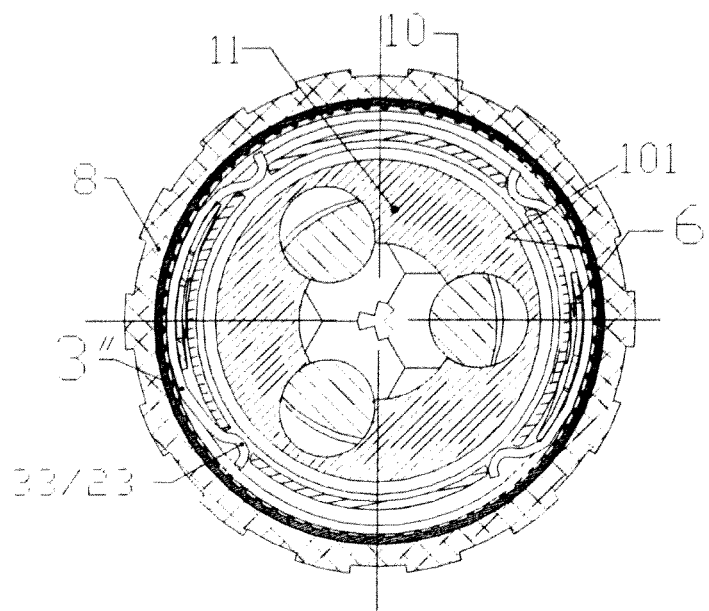
FIG. 5 is a sectional view of the force increasing self-locking drill chuck shown in FIG. 1 in a loosening state taken along line E-E.
Figure 6:
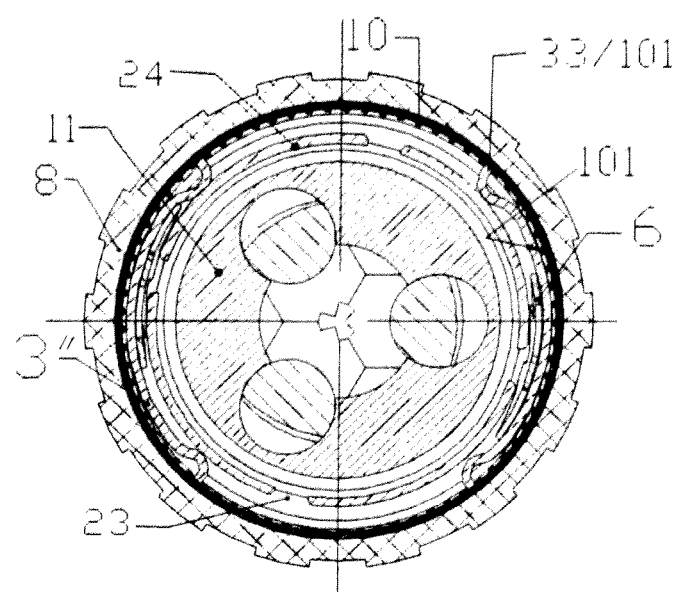
FIG. 6 is a sectional view of the force increasing self-locking drill chuck shown in FIG. 1 in a clamping state taken along line E-E.

As shown in FIG. 5, the clutch control portion 33 of the force bearing member 3" engages with the positioning groove 23 of the nut sleeve 2. As shown in FIG. 6, when the force bearing member 3" rotates relative to the nut sleeve 2, the clutch control portion 33 of the force bearing member 3" disengages from the positioning groove 23 of the nut sleeve 2 and then engages with the clutch teeth 101 of the clutch tooth sleeve by being abutted against by the outer wall of the nut sleeve 2.

Figure 7:
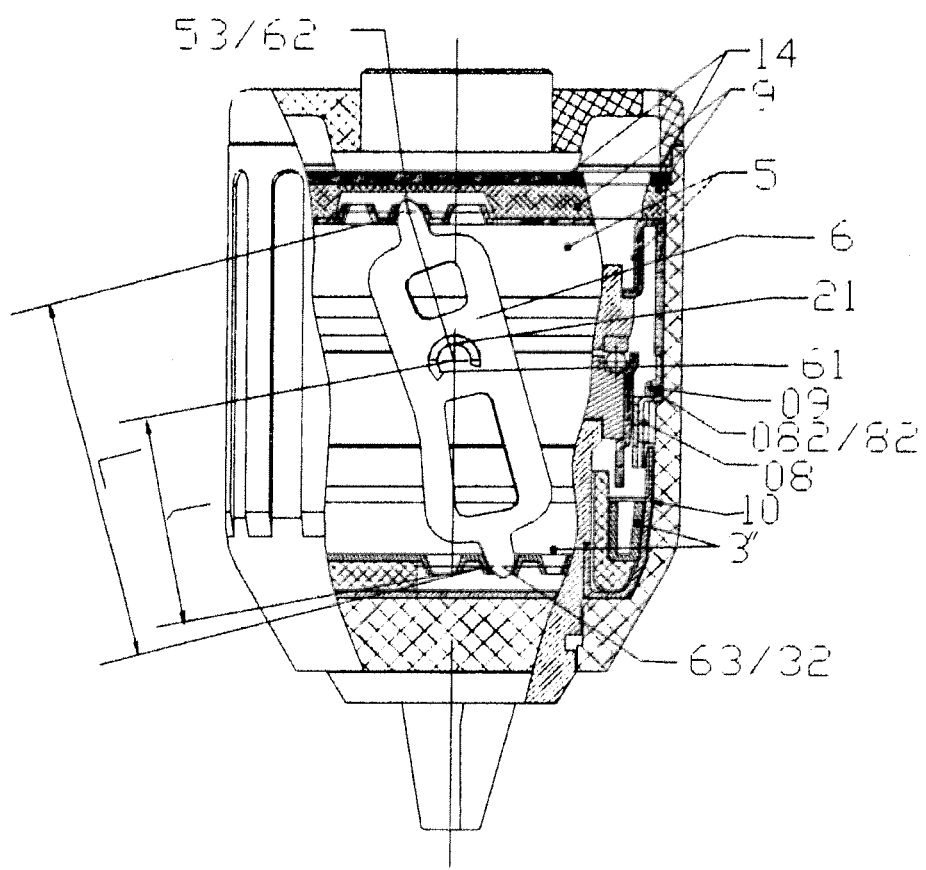
FIG. 7 is a right sectional view of various assemblies of the force increasing self-locking drill chuck shown in FIG. 1.

As shown in FIGS. 1 and 7, the force applying end 62 on the upper end of the lever 6 engages with the tooth groove 53 of the driving member 5, and the fulcrum end 63 at its lower end engages with the tooth groove 32 of the force bearing member 3", wherein the force applied portion 61 is rotatably assembled at the driving portion 21 of the nut sleeve. The control sleeve 08 is put around the inner wall of the coat, with the key 082 thereon inserted into the groove 82 of the coat, so that the control sleeve 08 rotates synchronously with the coat 8.

Figure 8A:
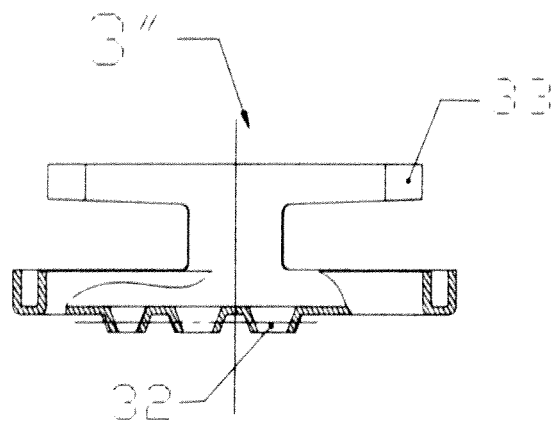
FIG. 8a is a front sectional view and a partial sectional view in direction F of the force bearing member 3" in the force increasing self-locking drill chuck shown in FIG. 1.
Figure 8B:
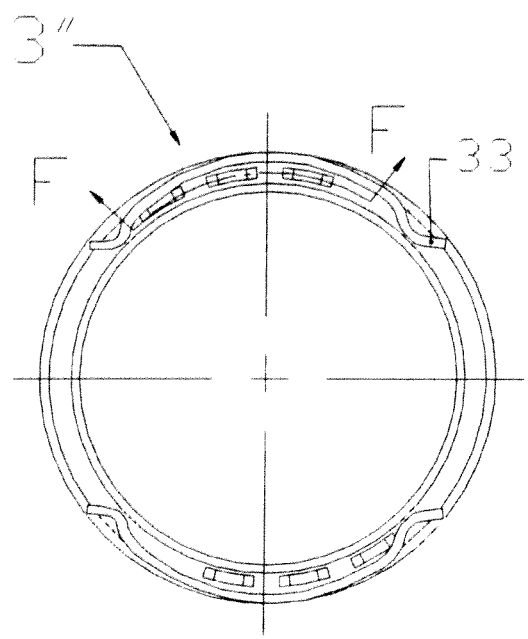
Figure 9:
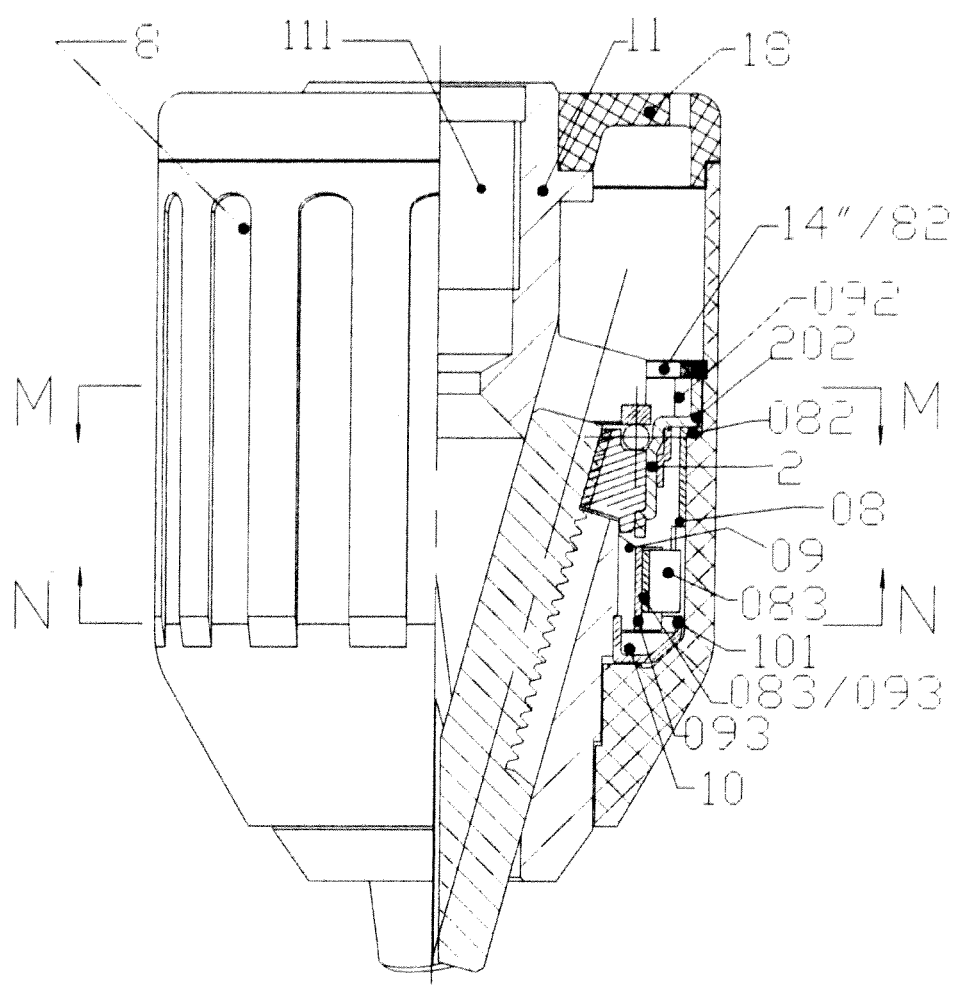
FIG. 9 is a front sectional view of the self-locking drill chuck according to the second embodiment of the present invention.

FIGS. 8a and 8b illustrate the force bearing member 3" which includes a tooth groove 32 in the lower end and is provided with a control portion 33 at the upper end.

The operation process of the force increasing self-locking drill chuck according to the present invention is described hereinafter in conjunction with FIGS. 1 to 8b.

The process of clamping the tool handle is described as follows:

When the jaws have not clamped the tool handle and are not under force, the nut is in a free rotation state, and the clutch control portion 33 of the force bearing member 3 engages with the positioning groove 23 of the nut sleeve by an elastic force (as shown in FIG. 5), so that the force bearing member 3 rotates synchronously with the nut sleeve 2, the force applied portion of the lever 6 is connected with the driving portion 21 of the nut sleeve, and the fulcrum end 63 engages with the tooth groove 32 of the force bearing member (as shown in FIG. 7), and in this state, the lever 6, the nut sleeve 2 and the force bearing member 3 rotate freely and synchronously, with the lever 6 not pivoting.

Meanwhile, in the above state, the control portion 083 of the control sleeve is located within the restoration groove 093 of the oval deformation ring (as shown in FIG. 2), so that the control sleeve 08 and the oval deformation ring 09 rotate synchronously, the key 082 of the control sleeve is inserted into the groove 82 of the coat (as shown in FIGS. 1 and 7), and the key 092 of the oval deformation ring is inserted between the two keys 54 of the driving member, and thus in this state, rotating the coat 8 makes the control sleeve 08, the oval deformation ring 09 and the driving member 5 rotate synchronously with the coat 8.

As the force applying end 62 of the lever 6 engages with the tooth groove 53 of the driving member, in the above state (when the jaws have not clamped the tool handle), as long as the coat is rotated, the control sleeve, the oval deformation ring, the driving member, the lever, a force bearing ring, the nut sleeve and nut all rotate about the axis of the chuck body at the same time, and the threads of the jaws engage with the threads of the nut, thus the rotation of the nut is converted to the backward and forward movement of the jaws.

The process of force increasing clamping and loosening preventing locking is described as follows:

Rotate the coat, and when the jaws clamp the tool handle, all assemblies that can rotate about the axis of the chuck body encounter resistance. Increased force is needed to continue rotating the coat in order to clamp the tool handle firmly.

(1) When the rotation moment increases to a certain value, firstly the control portion 083 slides out of the restoration groove 093 and rotates by the angle Q, meanwhile the groove side wall 802 of the coat is in contact with the key 54 (as shown in FIG. 3), the control portion 803 presses the oval deformation ring to produce oval deformation, so that it is changed from a circle with a radius D to an ellipse with a major axis D1 and a minor axis d1, and a part of the teeth 091 distributed on the oval deformation ring 091 engage with the teeth 101 of the clutch tooth sleeve (as shown in FIG. 4).

(2) Continue rotating the coat by applying force, and then the groove side wall 802 will push key 54 to bring the driving member 5 to rotate in the same direction. Here, the nut and the nut sleeve cannot move as the jaws clamp the tool handle, and thus the driving member 5 pushes the lever 6 so that it rotates about the positioning portion 21 of the nut sleeve, and as a result, the fulcrum portion of the lever pushes the force bearing member 3 to rotate in the direction contrary to the coat, thereby forcing the clutch control portion 33 to slide out from the positioning groove 23 (as shown in FIGS. 5 and 6), and the jaw tips of the clutch control portion 33 engages with the teeth 101 of the clutch tooth sleeve. That is, in this state, the force bearing member and the clutch tooth sleeve and the chuck body are fixed together, and do not have relative rotation therebetween.

At this time, keep continuing rotating the coat by applying force, and the driving member 5 will drive the lever 6 to rotate about the fulcrum end 63 (which engages with the force bearing member 3 which now does not have relative rotation with respect to the chuck body), the force applied portion 61 brings the nut sleeve 2 and the nut 12 via the driving portion 21 to slightly rotate about the axis of the chuck body, and drives the jaws to clamp the tool handle.

In the above force transmission process, (1) the treaded transmission of the nut and the jaws has the function of force increasing, and (2) level L>1, and the conversion process of force applied to the force applying end of the lever into the moment pushing the nut to rotate is a level force increasing process, and in this way, the moment applied to the coat, after the above process, is used to clamp the tool handle via force increasing.

Meanwhile, as the engagement of the teeth 091 of the oval deformation ring with the teeth 101 of the clutch tooth sleeve makes the driving member 5 connected with the oval deformation ring via key 092 and key 54 unable to rotate reversely with respect to the clutch tooth sleeve 10, and thus the lever, the nut sleeve and the nut are also unable to rotate reversely with respect to the clutch tooth sleeve (and the chuck body), so that the engagement of teeth 091 with teeth 101 has the function of locking and preventing loosening, which prevents reverse rotation of the nut due to vibration, in the operation condition of vibration.

The process of loosening the tool handle is described as follows:

Reversely rotate the coat 8 to bring the control sleeve 08 into synchronous rotation, until the control portion 083 rotates to the position of the restoration groove 093, and under an elastic force, the control portion 083 enters into the restoration groove 083 (as shown in FIG. 2), the teeth 091 disengage from the teeth 101, and the groove side wall 801 of the coat is now in contact with the key 54.

Continue rotating the coat 8, so that the groove side wall 801 pushes the driving member 5 to rotate via the key 54, and pushes the lever 6 to rotate about the fulcrum end 63 and brings the nut to rotate reversely, until the positioning groove 23 of the nut sleeve rotates to a position corresponding to the clutch control portion 33 of the force bearing member, and under an elastic force, the control portion 33 enters into the positioning groove 23 and the jaw tips thereof also disengages from the teeth 101, and continuing rotating the coat reversely makes the control member 5, the lever 6, the force bearing member 3, the nut sleeve 2 and the nut 12 rotate synchronously, until the jaws completely loosen the tool handle.

From the above description it can be seen that in this embodiment, the self-locking mechanism consists of the control sleeve 08, the oval deformation ring 09 and the clutch tooth sleeve 10.

The oval deformation ring is a key part, and the oval deformation ring 09 has a normal shape (the first shape) of being circular and an operation shape (the second shape) of being oval, with an outer teeth 091 provided at the major axis end, for engaging with the inner teeth of the clutch tooth sleeve 10. The control sleeve 08 is used for controlling the shape changing of the oval deformation ring, which is achieved by the control portion 083 in this embodiment, and matching the control sleeve, the restoration groove 093 is formed on the outer circumference of the oval deformation ring 09 spaced apart by 90 degrees from the outer teeth.

Wherein, the control portion 083 is initially located within the restoration groove 093, and when the control sleeve rotates with respect to the oval deformation ring 09, the control portion 083 disengages from the restoration groove 093 and abuts against the outer wall of the oval deformation ring 09, so that the oval deformation ring 09 is deformed to be oval, thereby realizing the engagement of the teeth 091 on the major axis of the oval deformation ring with inner teeth 101 of the clutch tooth sleeve. In this way, by selecting the shapes of the inner teeth and the outer teeth, the oval deformation ring can be controlled to rotate or not to rotate in one direction with respect to the chuck body 11, thereby rendering a desired self-locking mechanism.

The Second Embodiment

FIGS. 9 to 14 illustrate a self-locking drill chuck according to the second embodiment of the present invention, and being different from the first embodiment, in the second embodiment the lever 6, the driving member 5 and the force bearing element 3" are removed.

The assembling of respective assemblies of the self-locking drill chuck according to the present invention is described hereinafter in conjunction with FIGS. 9 to 14.

As shown in FIGS. 9 to 14, the nut sleeve includes a key 202, the key 082 of the control sleeve 08 is assembled within the groove between the groove side walls 801 and 802 of the coat, and the control sleeve 08 rotates synchronously with the coat; the key 202 of the nut sleeve and the key 092 of the oval deformation ring are located between the groove side walls 802 and 801 of the coat and can rotate by the angle Q with respect to the coat.

Figure 10:
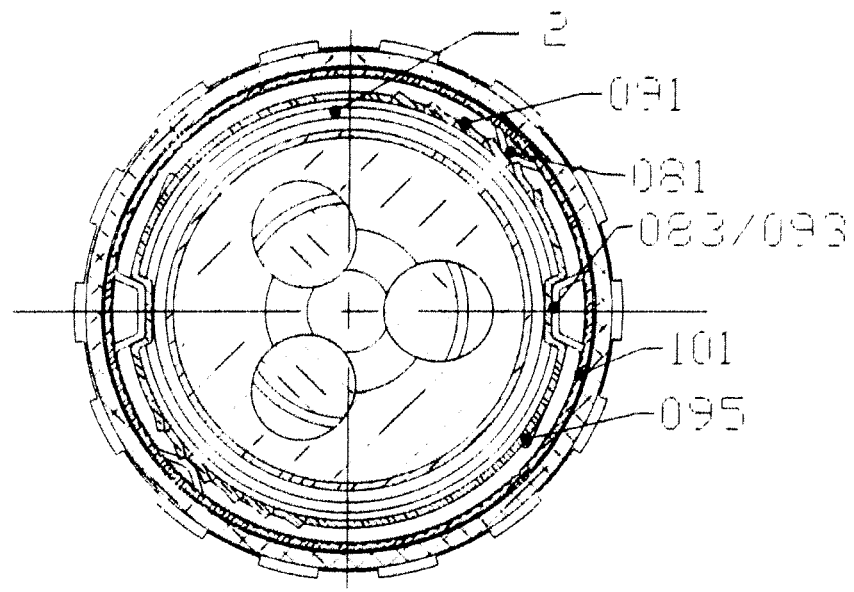
FIG. 10 is a sectional view of the self-locking drill chuck shown in FIG. 9 in a loosening state taken along line N-N.
Figure 11:
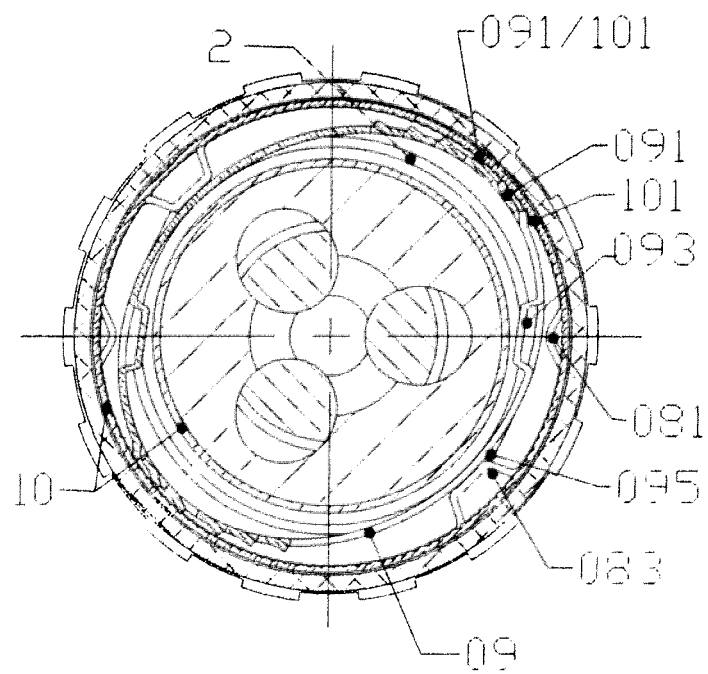
FIG. 11 is a sectional view of the self-locking drill chuck shown in FIG. 9 in a clamping state taken along line N-N.
Figure 13:
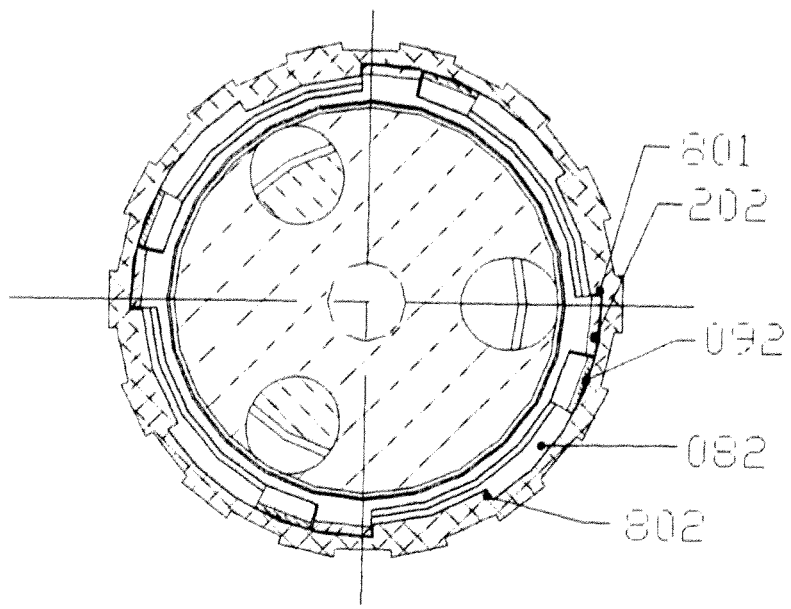
FIG. 13 is a sectional view of the self-locking drill chuck shown in FIG. 9 in a loosening state taken along line M-M.
Figure 14:
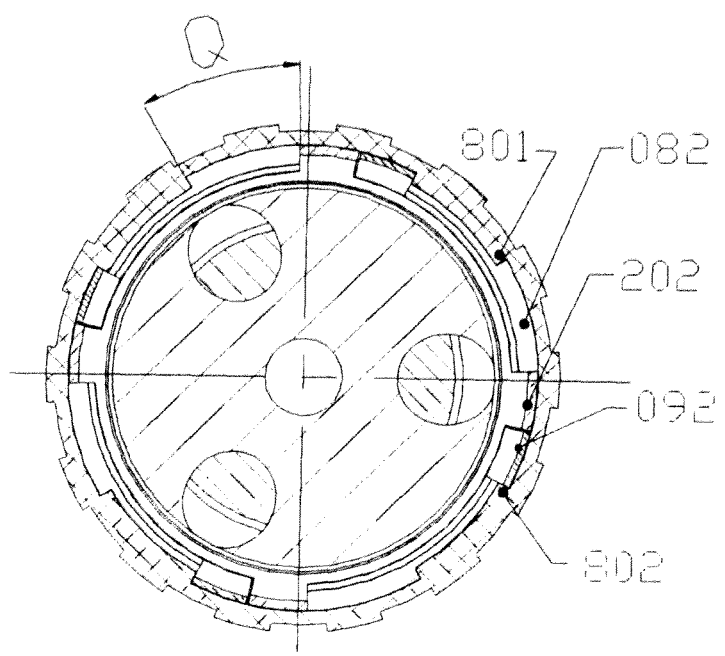
FIG. 14 is a sectional view of the self-locking drill chuck shown in FIG. 9 in a clamping state taken along line M-M.

As shown in FIGS. 10 and 13, in the state that the coat can rotate freely and the jaws can move freely, the control portion 083 of the control sleeve is located within the restoration groove 093 of the oval deformation ring, and the key 092 and key 202 sequentially lean towards the groove side wall 801 of the coat.

Figure 12A:
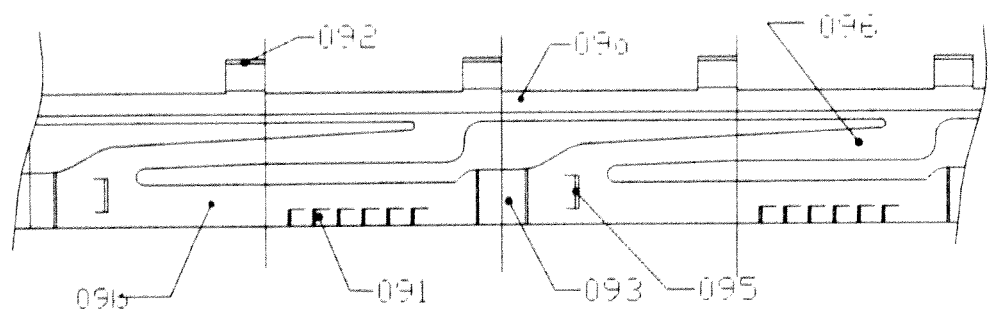
FIG. 12a is a developed view of a first oval deformation ring of the self-locking drill chuck shown in FIG. 9.
Figure 12B:
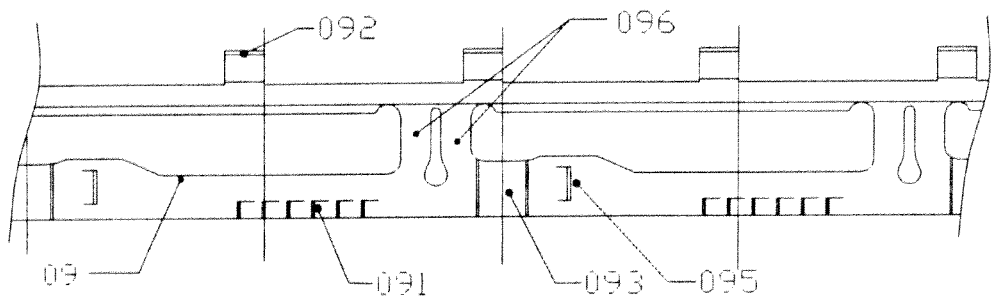
FIG. 12b is a developed view of a second oval deformation ring of the self-locking drill chuck shown in FIG. 9.

FIGS. 12a and 12b illustrate the developed view of the oval deformation ring. The connecting portion 096 of the oval deformation ring 09 connects the upper ring portion 09a and the lower ring portion 09b of the oval deformation ring 09 together. In FIG. 12a, the connecting portion 096 extends along the circumference, and in FIG. 12b, the connecting portion 096 extends along the axis.

The operation process of the self-locking drill chuck according to this embodiment will be described hereinafter.

The process of clamping the drill handle is described as follows:

After the coat has been rotated in the forward direction and the jaws have been in contact with the drill handle, continue rotating the coat, and then the control portion 083 of the control sleeve rotating synchronously with the coat disengages from the restoration groove 093 and rotates by the angle Q, and slides to the position of the positioning portion 095, the teeth 091 at the oval major axis also engages with the inner teeth 101 of the clutch tooth sleeve, and the side wall 802 of the coat is contact with the key 092 of the oval deformation ring.

Then continue rotating the coat, and then the side wall 802 of the coat pushes the key 092, so that the oval deformation ring 09, the out sleeve 2, and the nut 12 rotate about the axis of the chuck body, and the jaws are driven to clamp the drill handle with increased force. The engagement of the teeth 091 with the teeth 101 has the function of locking and preventing loosening.

The process of loosening the drill handle is described as follows:

If the drill handle is to be loosened, rotate the coat reversely, which also brings the control sleeve 08 to rotate reversely by the angle Q with respect to the oval deformation ring 09 and the nut sleeve 2, so that the control portion 083 returns back to the restoration groove 093, the teeth 091 also disengages from the teeth 101 of the clutch tooth sleeve under the elastic force of the oval deformation ring 09 and the effect of the protrusion 081, and the side wall 801 of the coat gets into contact with the driving key 202. Continue rotating the coat and the control sleeve, and then the nut sleeve 2 and the oval deformation ring 09 rotate therewith so that jaws loosen the drill handle.

From the above description it can be seen that being different from the self-locking mechanism according to the first embodiment, in the self-locking mechanism according to this embodiment, the oval deformation ring 09 is driven by side walls 801 and 802 of the coat 8; the control sleeve 08 is provided thereon with the protrusion 081, which helps to restore the deformed oval deformation ring to return circular, so that the pawl 091 completely disengages from the teeth 101 of the clutch tooth sleeve 10. In addition, the oval deformation ring 09 according to this embodiment includes the upper and lower portions which are connected via the connecting portion 096.

The Third Embodiment

Figure 15:
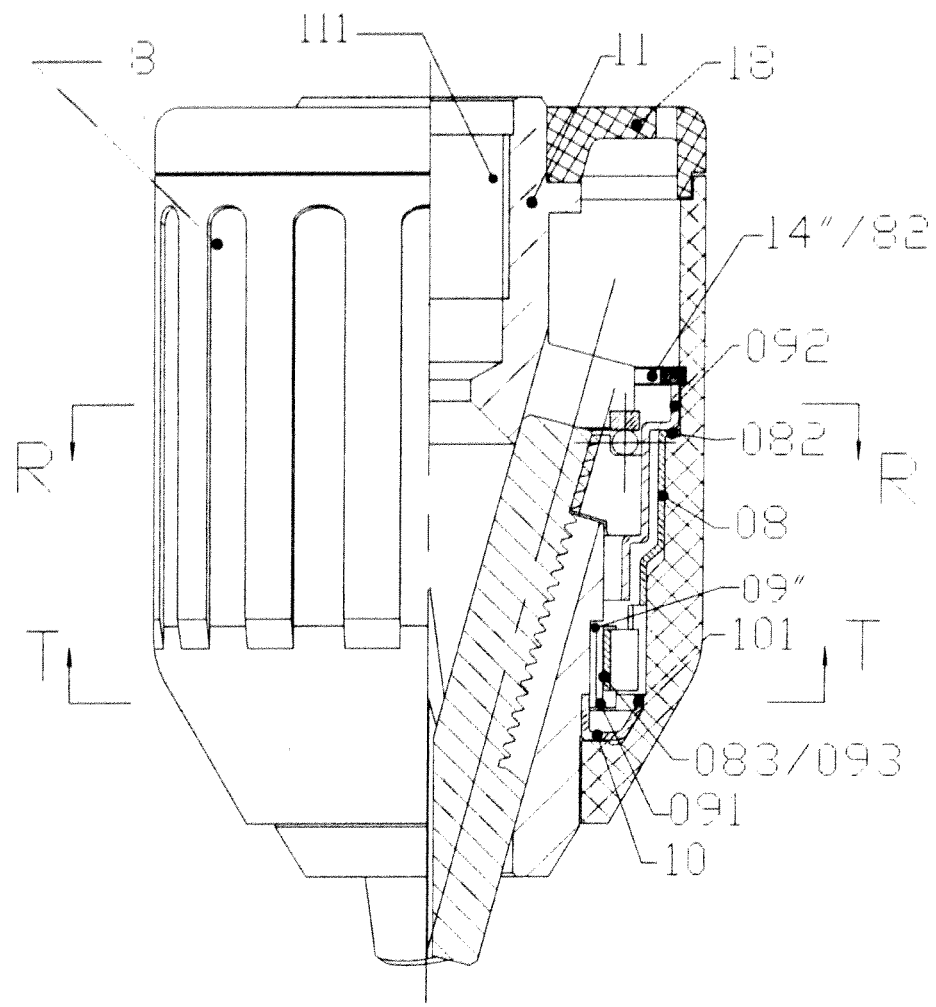
FIG. 15 is a front sectional view of the self-locking drill chuck according to the third embodiment of the present invention.
Figure 16:
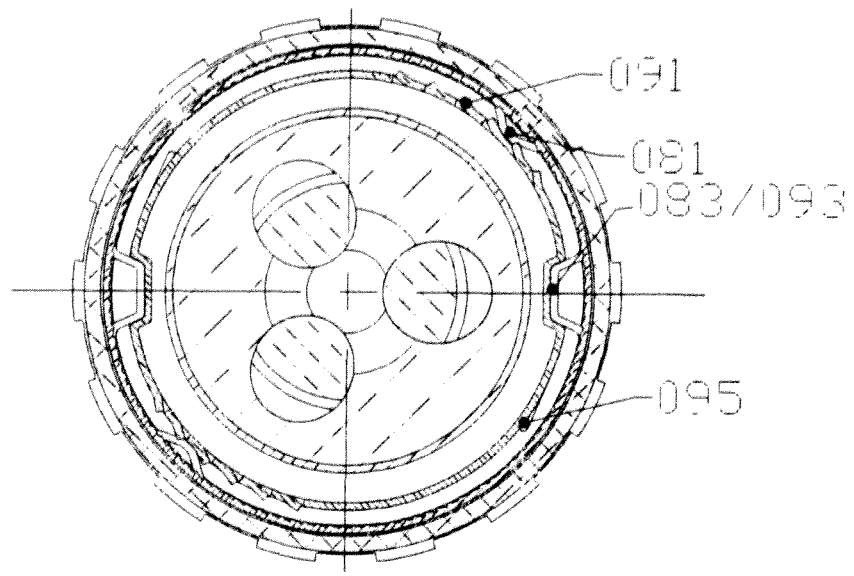
FIG. 16 is a sectional view of the self-locking drill chuck shown in FIG. 15 in a loosening state taken along line T-T.
Figure 17:
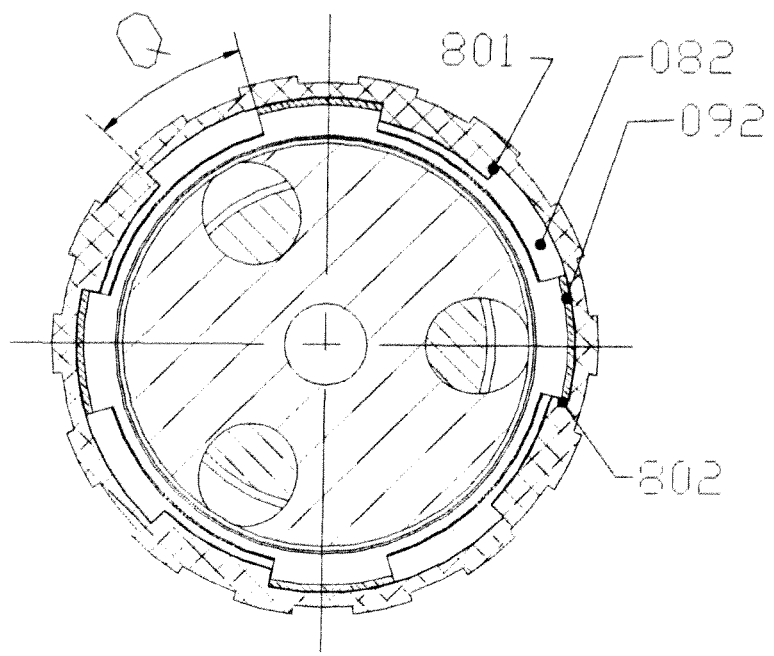
FIG. 17 is a sectional view of the self-locking drill chuck shown in FIG. 15 in a clamping state taken along line R-R.
Figure 18:
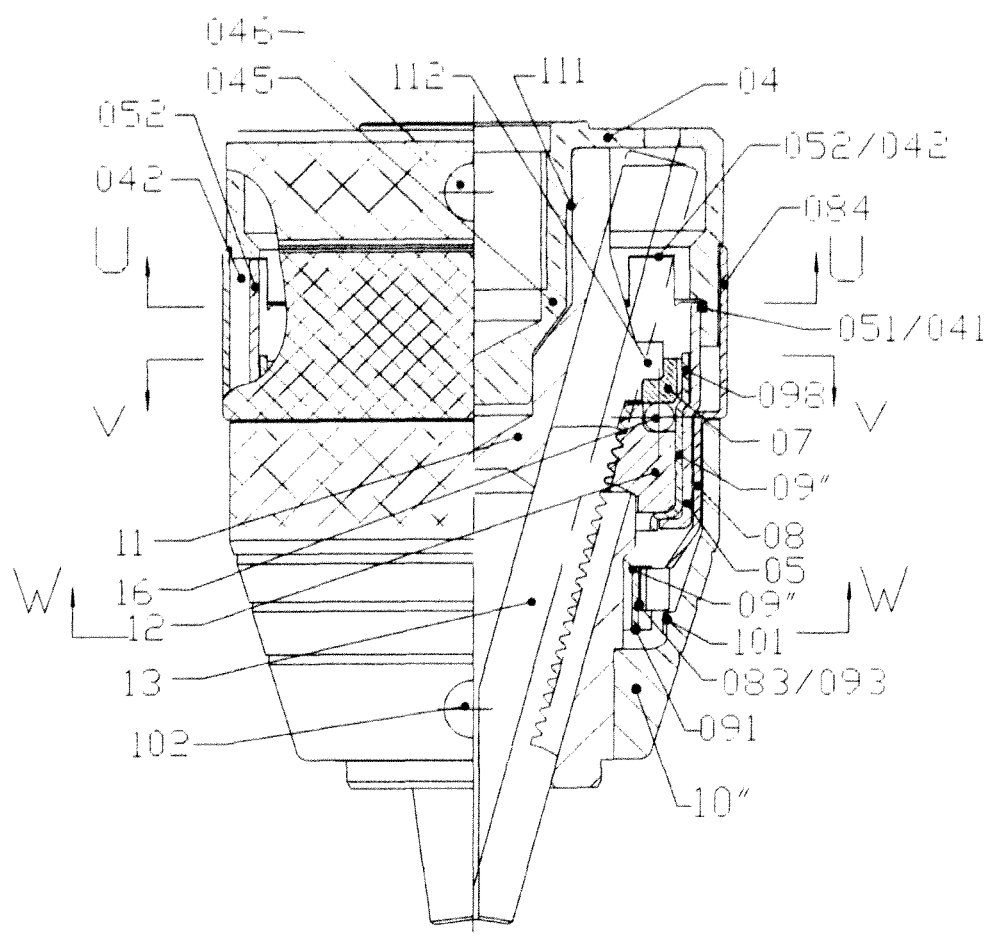
FIG. 18 is a front sectional view of the self-locking drill chuck according to the fourth embodiment of the present invention.
Figure 19:
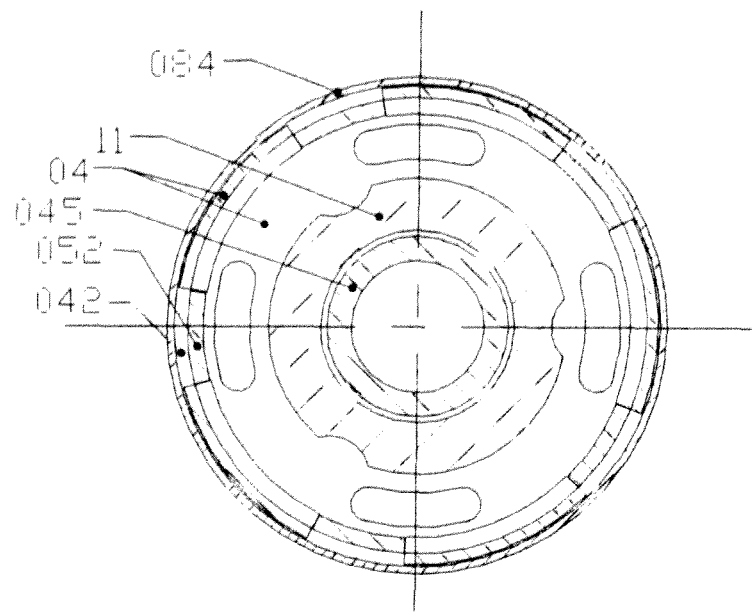
FIG. 19 is a sectional view of the self-locking drill chuck shown in FIG. 18 taken along line U-U.
Figure 20:
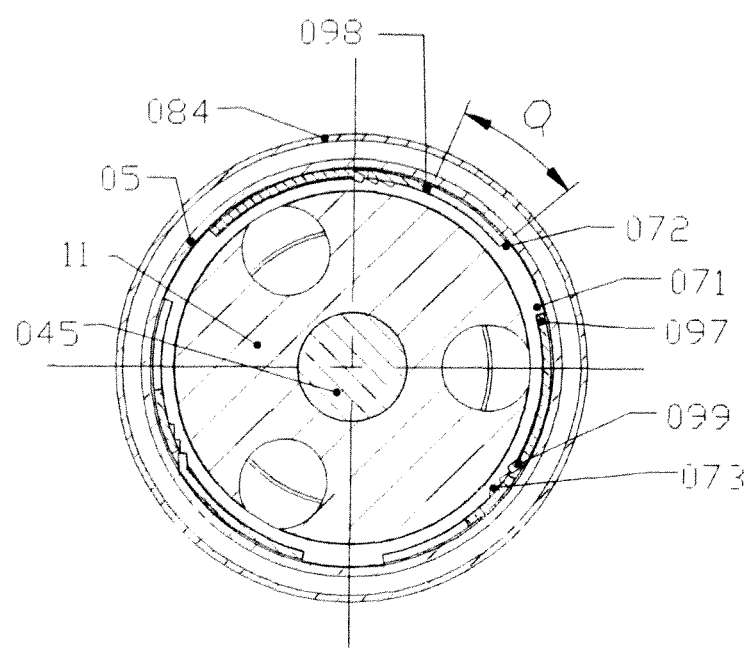
FIG. 20 is a section view of the self-locking drill chuck shown in FIG. 18 in a loosening state taken along line V-V.

FIGS. 15 to 17 illustrate a self-locking drill chuck according to the third embodiment of the present invention.

Being different from the second embodiment, in the third embodiment, the nut sleeve 2 and the oval deformation ring 09 in the second embodiment are formed integrally as the oval deformation ring 09'', that is, the rear portion (the function of a nut sleeve) of the oval deformation ring 09'' integrally fastens the split-body nuts 12, and thus the split-body nuts 12 are positioned at the chuck body, with the restoration groove 093, the positioning portion 095 and the teeth 091 formed at the front portion.

The Fourth Embodiment

FIGS. 18 to 22 illustrate a self-locking drill chuck according to the fourth embodiment of the present invention. The assembling of respective assemblies will be described hereinafter in conjunction with FIGS. 18 to 22.

The drill chuck is connected with the driving shaft of a power machine via the screw hole (or a cone hole) of the connecting sleeve 04, and the shaft 045 of the connecting sleeve is rotatably mounted within the connection hole 111 of the chuck body.

The intermediate sleeve 05 is fixedly connected with the rear portion of the oval deformation ring and rotates synchronously with the oval deformation ring 09'' and the nut 12, with the clamping portion 051 and the driving key 052 of the intermediate sleeve respectively connected with the clamping groove 041 and the driving groove 042 of the connecting sleeve, so that the intermediate sleeve 05 is connected with the connecting sleeve 04 axially and rotates synchronously therewith. The oval deformation ring 09'' also rotates synchronously with the nut 12.

The friction ring 07 is rotatably mounted between the bearing 16 and the support stand 112 of the chuck body. The insertion holes 102 and 046 are provided to save force in loosening the tool handle.

The operation process of the self-locking drill chuck according to this embodiment will be described hereinafter.

Figure 21:
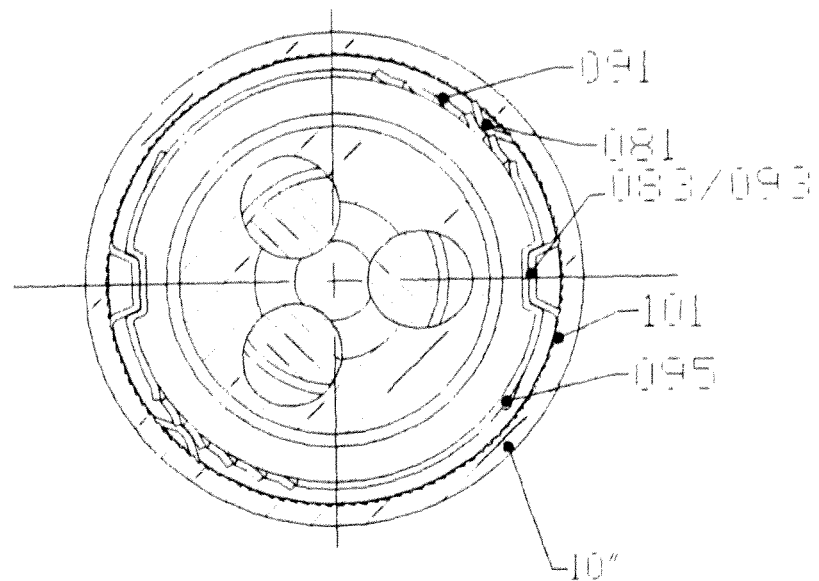
FIG. 21 is a sectional view of the self-locking drill chuck shown in FIG. 18 in a loosening state taken along line W-W.
Figure 22:
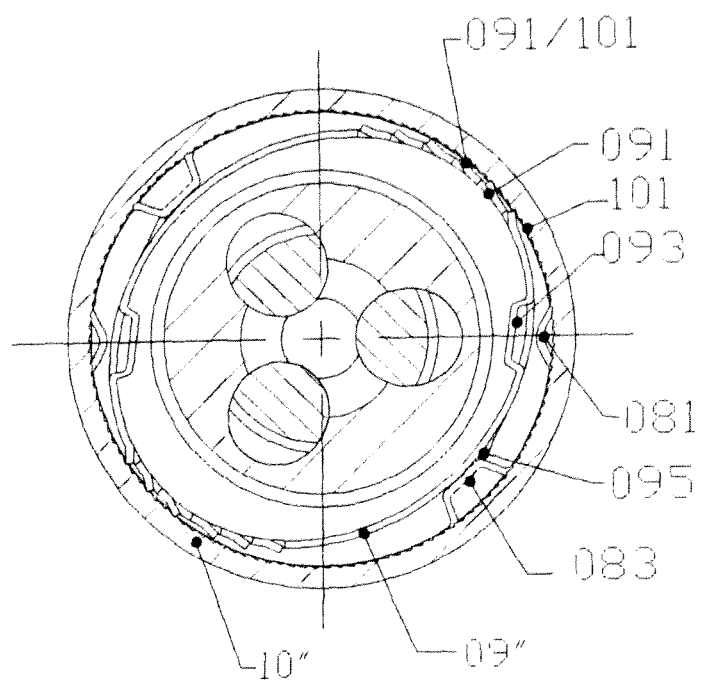
FIG. 22 is a sectional view of the self-locking drill chuck shown in FIG. 18 in a clamping state taken along line W-W.

The process of clamping the tool handle is described as follows:

During operation, firstly hold with hand the clutch tooth sleeve 10'' and the connection sleeve 04 and rotate them with respect to each other in the forward direction, which brings the nut 12 to rotate with respect to the chuck body, and drives the jaws 13 to clamp the tool handle; then reversely rotate the holding portion 084 of the control sleeve so that the control portion 083 slides out from the restoration groove 093 (as shown in FIG. 21), and turns to the position of the positioning portion 095 (as shown in FIG. 22), and the teeth 091 also engages with the teeth 101.

In this state, the nut and the oval deformation ring cannot rotate reversely, that is, the nut is in a locking state of being unable to rotate reversely with respect to the chuck body and the jaws, so as to prevent the held tool from loosening due to vibration. Now, when the power machine is used to conduct operations such as drilling holes, the forward driving moment of the power machine to the connecting sleeve and the nut and the reverse moment of the hole drilling operation to the tool handle and the jaws form a moment of clamping the tool handle, so that the jaws firmly clamp the tool handle.

The process of loosening the tool handle is described as follows:

If the tool handle is to be loosened, firstly rotate the holding portion 084 in the forward direction so that the control portion 083 rotates from the position shown in FIG. 22 to the initial position shown in FIG. 21, relieve the locking state, and then reversely rotate the clutch tooth sleeve 10'' and the connecting sleeve 04 with respect to each other, the tool handle can be loosened.

The friction ring 07 aims to prevent a too large clamping force to the tool handle created during above operation process, as the too large clamping force may render it not easy to loosen the tool handle after the operation.

The working principle of providing the friction ring 07 is descried as follows: while the driving clamping force does not exceed a certain value, the forward driving clamping moment delivered by the power machine from the connecting sleeve 04 via the intermediate sleeve to the oval deformation ring 09 drives via the driving jaw 099 the friction ring 07 to rotate synchronously with the nut 12 (the rolling bearing 16 does not roll).

When the clamping force of the jaws to the tool handle is gradually increasing, the pressure of the nut to the friction ring 07 via the bearing 16 is also increasing gradually, the friction between the friction ring 07 and the support stand 112 is also increasing gradually and when it reaches a certain value, the driving jaw 099 overcomes its own smaller elastic force and slides out from the tooth groove 073, thus the oval deformation ring together with the driving jaw 099, the driving keys 097 and 098 and the nut rotate (now the rolling bearing 16 rolls), until they rotates by an angle a and then the driving key 098 is in contact with the key side wall 072 of the friction ring.

The above state appears after the jaws have clamped the tool handle, and the nut has rotated by the angle a with respect to the jaws, the clamping force as created and the friction between the friction ring 07 and the support stand 112 also increase greatly, now if the clamping force of the jaws to the tool handle is to be increased continuously, besides overcoming the friction between the nut and the threads of the jaws, the driving key 098 of the oval deformation ring has also to push the friction ring 07 undergoing a large friction to rotate, namely, a large part of the driving moment applied by the power machine is directly applied to the chuck body via the driving key 098 and the friction ring 07, and just a small part thereof is used to drive the nut and continue increasing the clamping force, and thus it is hard to continue increasing the clamping force of the jaws to the tool handle when it reaches a certain value.

During loosening, the keys 098 and 097 of the oval deformation ring and the driving jaw 099 rotate towards the loosening direction, and the friction ring 07 does not move first, the rolling bearing 16 first rotates with respect to the friction ring 07, as rolling friction is far less than the sliding friction, a small force can realize rotation by the angle a, so that the key 097 gets in contact with the key side wall 071. As reverse rotation by the angle a has been achieved, the positive pressure and the friction between the friction ring 07 and the support stand 112 decrease greatly, and then just a small force can continue rotating the oval deformation ring, the friction ring and the nut sleeve, until the jaws loosen the tool handle.

Those skilled in the art would understand that the oval deformation ring in this embodiment has the same basic function with the preceding oval deformation ring, and is in a sleeve shape for holding.

The Fifth Embodiment

Figure 23:
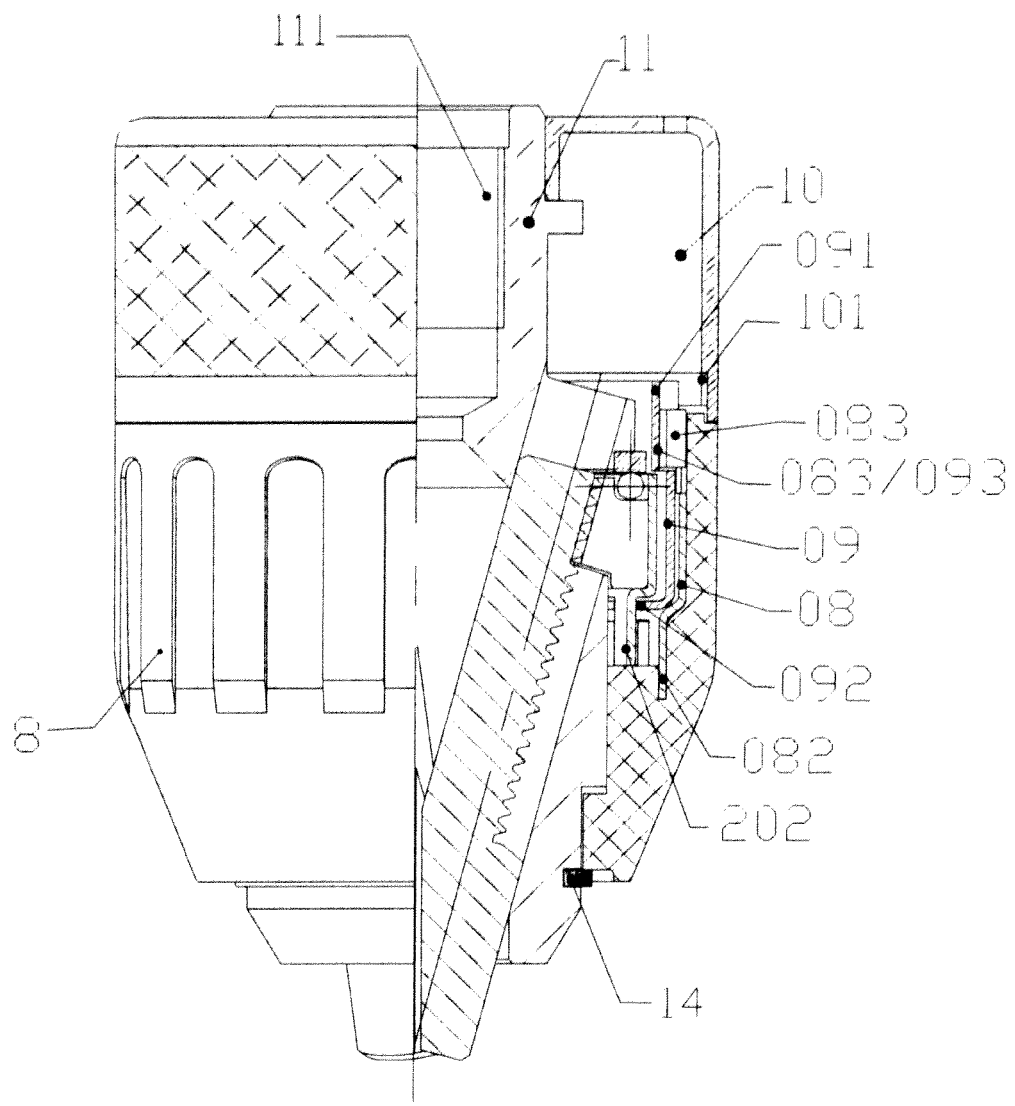
FIG. 23 is a front sectional view of the self-locking drill chuck according to the fifth embodiment of the present invention.

FIG. 23 illustrates a self-locking drill chuck according to the fifth embodiment of the present invention. Being different from the second embodiment, in this embodiment the rear sleeve of the drill chuck also serves as the clutch tooth sleeve 10, with the teeth 101 formed on its inner circumference which engages with the teeth 091 at the major axis end of the oval deformation ring 09 under control.

The Sixth Embodiment

Figure 24:
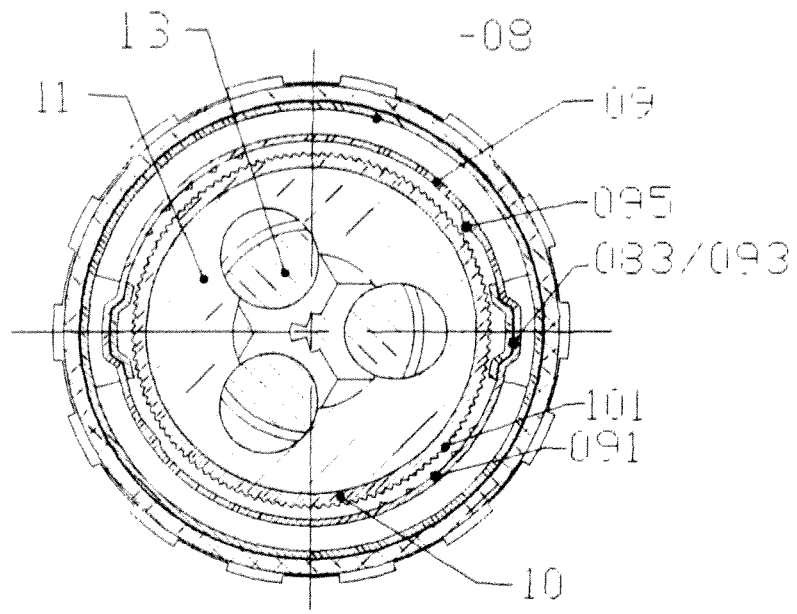
FIG. 24 is a sectional view of the self-locking drill chuck in a loosening state according to the sixth embodiment of the present invention, wherein a varied embodiment of the self-locking mechanism is shown.
Figure 25:
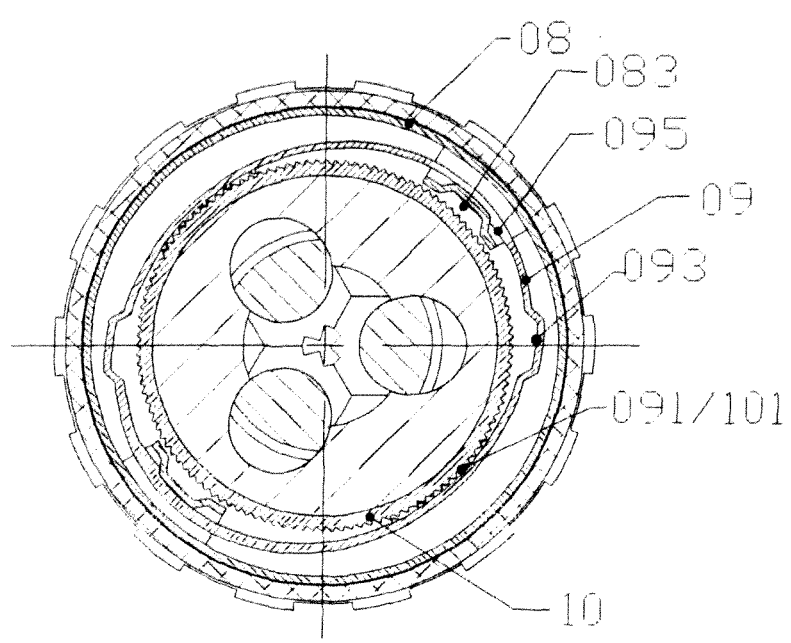
FIG. 25 is a sectional view of the self-locking drill chuck shown in FIG. 24 in a clamping state.

FIGS. 24 and 25 illustrate a self-locking drill chuck according to the sixth embodiment of the present invention, with a varied embodiment of the self-locking drill chuck shown.

As shown in FIGS. 24 and 25, the oval deformation ring 09 has inner teeth 091 at the inner circumferential wall, and the clutch tooth sleeve 10 is located at the inner side of the oval deformation ring 09 and has the outer teeth 101, and when the oval deformation ring is changed from being circular to be oval, the inner teeth 091 thereof engages with the outer teeth of the clutch tooth sleeve 10.

The control portion 083 of the control sleeve 08 is located within the gap between the oval deformation ring 09 and the clutch tooth sleeve 10, for controlling the conversion of the oval deformation ring between being circular and being oval.

The oval deformation ring 09 is provided therein with the restoration groove 093 for positioning the control portion 083 of the control sleeve 08 therein (as shown in FIG. 24). When the control sleeve 08 rotates by a certain angle with respect to the oval deformation ring 09, the control portion 083 disengages from the positioning groove 093 and abuts against the side wall of the oval deformation ring so that it is changed to be oval. In this way, the teeth 091 of the oval deformation ring engages with the outer teeth of the clutch tooth sleeve 10, thereby realizing self-locking.

The Seventh Embodiment

FIGS. 26-29 illustrate a self-locking drill chuck according to the seventh embodiment of the present invention, which is a varied embodiment of the second embodiment.

Figure 26:
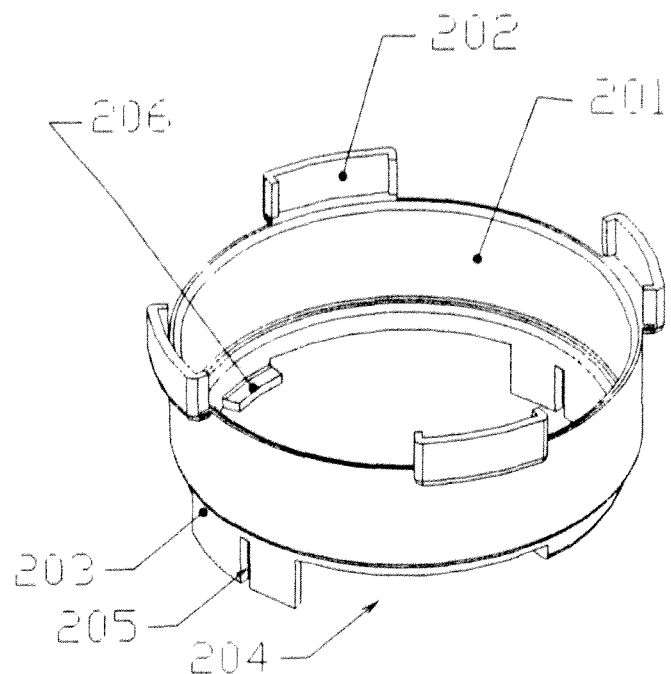
FIG. 26 is a schematic view of the perspective structure of the nut sleeve of the self-locking drill chuck according to the seventh embodiment of the present invention.

FIG. 26 illustrates the nut sleeve 2 which comprises a body 201 in a sleeve shape. The body 201 comprises at the top end multiple keys 202 extending by protruding out of the body 201, and comprises at the lower end a hook key 206 extending inward radially and extension wall portions 203 with key grooves 205 provided therein, and between the extension wall portions are empty slots 204.

Figure 27:
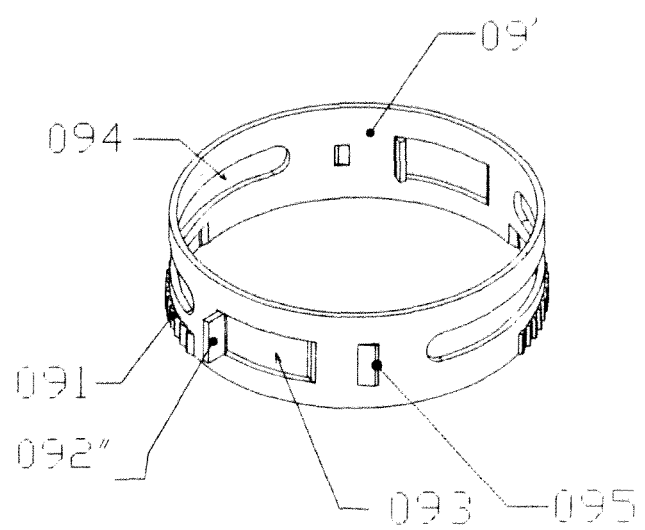
FIG. 27 is a schematic view of the perspective structure of the oval deformation ring of the self-locking drill chuck according to the seventh embodiment of the present invention.

FIG. 27 illustrates the oval deformation ring 09' which is provided at the ring body with a hook key positioning groove 094, a restoration groove 093, a positioning portion 095 extending outward and multiple teeth 091.

Figure 28:
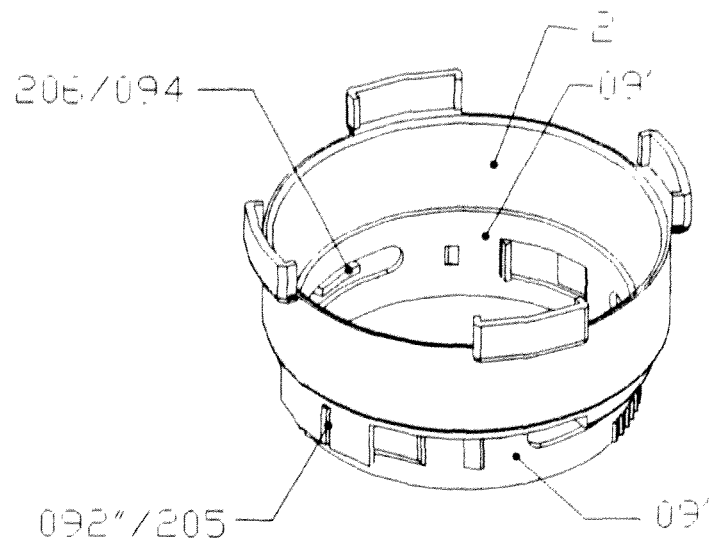
FIG. 28 is a schematic view of the assembling of the oval deformation ring and the nut sleeve of the self-locking drill chuck according to the seventh embodiment of the present invention.

FIG. 28 illustrates that the oval deformation ring 09' is assembled at the lower end of the nut sleeve 2, wherein the oval deformation ring 09' is respectively connected to the key groove 205 and the hook key 206 of the out sleeve 2 via the key 092" extending outward and the hook key positioning groove 094, so that the oval deformation ring 09' is connected together with the nut sleeve 2 and rotates synchronously with the same.

Figure 29:
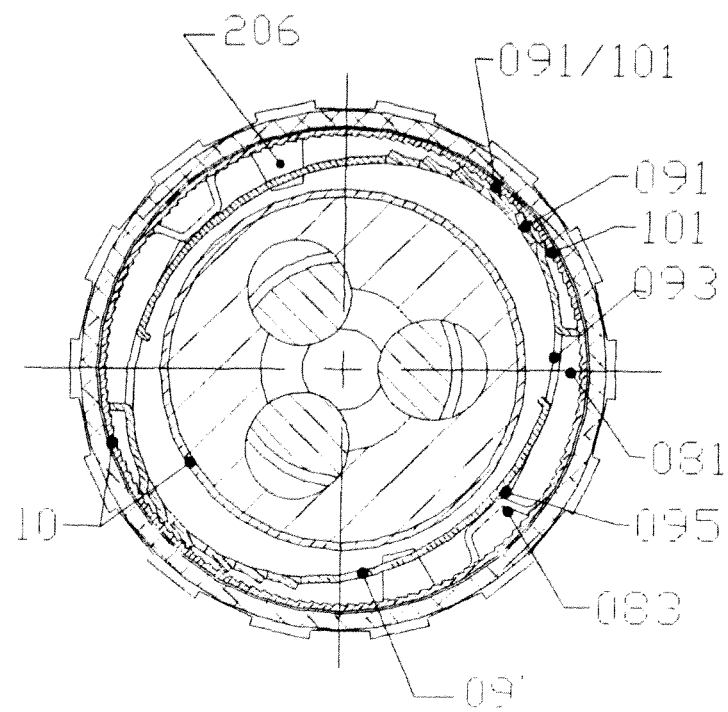
FIG. 29 is a sectional view of the self-locking drill chuck in a clamping state according to the seventh embodiment of the present invention.

Referring to FIG. 29 in conjunction with FIGS. 9-14 in the second embodiment, wherein the key 202 of the nut sleeve 2 is located between groove side walls 801 and 802 of the coat, and the nut sleeve 2 can rotate by the angle Q with respect to the coat.

In the state that the coat can rotate freely and the jaws can move freely, the control portion 083 of the control sleeve is located within the restoration groove 093 of the oval deformation ring, and the key 202 abuts outward against the groove side wall 801 of the coat.

The process of clamping the drill handle is described as follows:

After the coat has been rotated in the forward direction and the jaws have been in contact with the drill handle, continue rotating the coat, and then the control portion 083 of the control sleeve rotating synchronously with the coat disengages from the restoration groove 093 of the oval deformation ring and rotates by the angle Q, and slides to the position of the positioning portion 095, the teeth 091 at the oval major axis also engage with the inner teeth 101 of the clutch tooth sleeve, and the side wall 802 of the coat is in contact with the key 202 of the nut sleeve 2.

Then continue rotating the coat, and then the side wall 802 of the coat pushes the key 202 of the nut sleeve 2, so that the oval deformation ring 09', the nut sleeve 2, and the nut 12 rotate about the axis of the chuck body, and the jaws are driven to clamp the drill handle with increased force. The engagement of the teeth 091 with the teeth 101 has the function of locking and preventing loosening.

The process of loosening the drill handle is described as follows:

If the drill handle is to be loosened, rotate the coat reversely, which also brings the control sleeve 08 together to rotate reversely by the angle Q with respect to the oval deformation ring 09' and the nut sleeve 2, so that the control portion 083 returns back to the restoration groove 093, the teeth 091 also disengage from the teeth 101 of the clutch tooth sleeve under the elastic force of the oval deformation ring 09' and the effect of the protrusion 081, and the side wall 801 of the coat gets into contact with the key 202 of the nut sleeve 2. Continue rotating the coat and the control sleeve, and then the nut sleeve 2 and the oval deformation ring 09 rotate therewith so that jaws loosen the drill handle.

From the above description, it can be seen that different from the second embodiment, in this embodiment the oval deformation ring 09' is directly connected to the lower end of the nut sleeve 2, and the nut sleeve 2 drivably engages with the coat; during clamping the drill handle, the nut sleeve brings the coat to rotate which then brings the nut sleeve to rotate during loosening the drill handle, and in this way, the structure of the drill chuck is simplified and the size of the oval deformation ring in the axial direction of the drill chuck is reduced, and as a result, if the same material is used, the structure strength of the oval deformation ring 09' is improved, and then the reliability of the drill chuck is further improved.

The Eighth Embodiment

Figure 30:
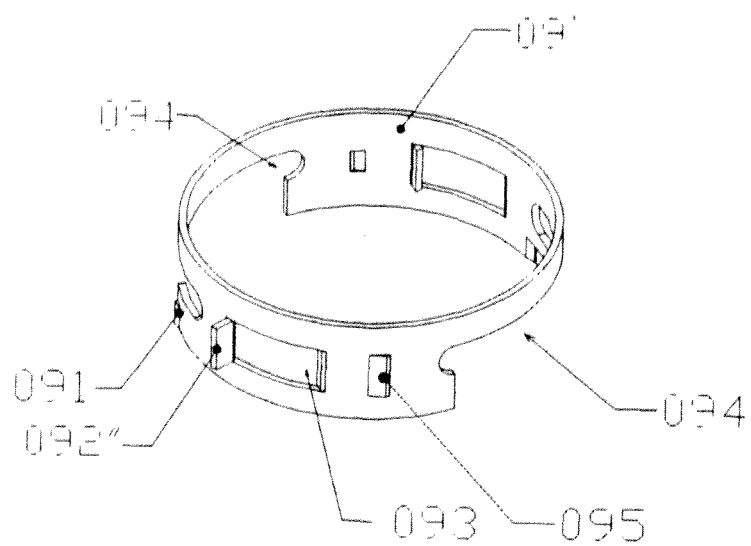
FIG. 30 is a schematic view of the perspective structure of the oval deformation ring of the self-locking drill chuck according to the eighth embodiment of the present invention.
Figure 31:
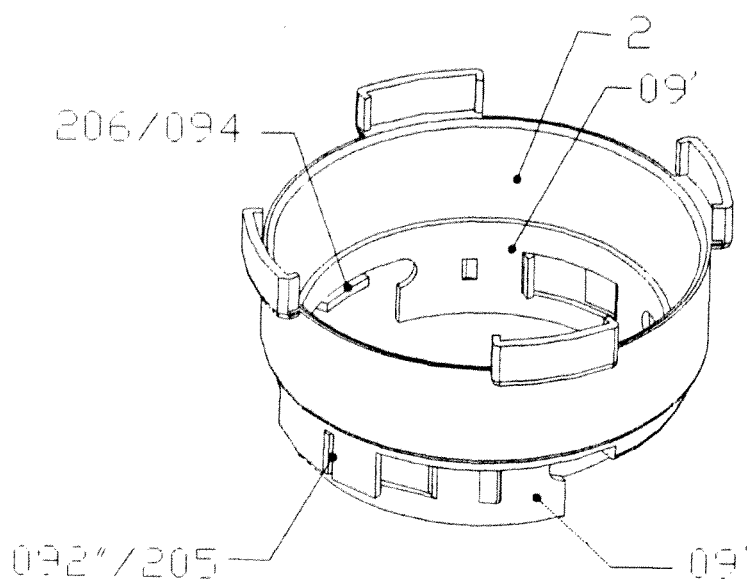
FIG. 31 is a schematic view of the assembling of the oval deformation ring and the nut sleeve of the self-locking drill chuck according to the eighth embodiment of the present invention.
Figure 32:
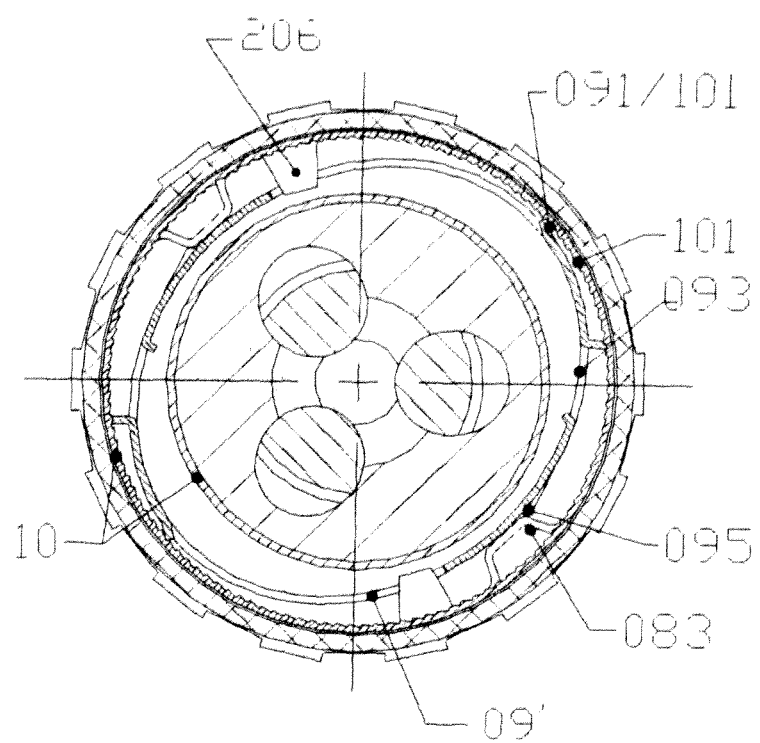
FIG. 32 is a sectional view of the self-locking drill chuck in a clamping state according to the eighth embodiment of the present invention.

FIGS. 30-32 illustrate a self-locking drill chuck according to the eighth embodiment of the present invention. Compared with the drill chuck in the seventh embodiment, the structure of the oval deformation ring 09' is further simplified.

FIG. 30 illustrates the oval deformation ring 09' with a simplified structure, wherein the material under the hook key positioning groove 094 in the ring body has been removed, and thus a material removal region is formed, with only one tooth or two teeth 091 maintained, and in this way, the oval deformation ring 09' is more flexible and is easier for production.

From the above description, the self-locking mechanism according to the present invention can be used in drill chucks of multiple structures, and provides a brand-new thought for the designs of the self-locking mechanisms of drill chucks.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

DESCRIPTION OF REFERENCE SIGNS

| | |
|---|---|
| 2-nut sleeve, | 201-nut sleeve body, |
| 202-key, | 203-extension wall portion, |
| 204-empty slot, | 205-key groove, |
| 206-hook key, | |
| 21-driving portion, | 23-positioning groove, |
| 24-lower ring portion, | |
| 3"-force bearing member, | 32-tooth groove, |
| 33-clutch control portion, | |
| 4-lock ring, | 44-ratchet, |
| 45-key, | 46-positining portion, |
| 47-pawl, | |
| 04-connecting sleeve, | 041-clamping groove, |
| 042-driving groove, | 045-shaft, |
| 046-insertion hole, | |
| 05-intermediate sleeve, | 051-clamping portion, |
| 052-driving key, | 5-driving member, |
| 53-tooth groove, | 54-key, |
| 6-lever, | 61-force applied portion, |
| 62-force applying end, | 63-fulcrum end, |
| 7-shaft sleeve, | 72-rolling ball, |
| 07-friction ring, | 071, 072-key side wall, |
| 073-tooth groove, | |
| 8-coat, | 801, 802-groove side wall, |
| 82-groove, | |
| 08-control sleeve, | 081-protrusion, |
| 082-key, | 083-control portion, |
| 084-holding portion, | |
| 09, 09"-oval deformation ring, | 091-teeth, |
| 092-key, | 093-restoration groove, |
| 095-positioning portion, | 096-connecting portion, |
| 097, 098-driving key, | 099-driving jaw, |
| 9-washer, | |
| 10, 10"-clutch tooth sleeve, | 101-clutch tooth, |
| 102-insertion hole, | 11-chuck body, |
| 111-connecting hole (shaft hole, thread hole or cone hole), | |
| 112-suport stand, | 12-nut, |
| 13-jaw, | 14-clamp spring, |
| 15-bearing washer, | 16-bearing, |
| 18-rear cover. | |

What is claimed is:

1. A drill chuck, characterized in comprising,
a chuck body (11), comprising therein multiple equally distributed slanting holes along the circumference;
multiple jaws (13), slideably provided within the slanting holes of the chuck body (11), and having threads at a rear end;
a split-body nut (12), rotatably provided around the chuck body (11) and joining the threads of the jaws (13); and
a nut sleeve (2), closely put around the split-body nut (12);
characterized in further comprising:
a connecting sleeve (04), rotatably mounted within a connecting hole (111) of the chuck body (11) and connected with a driving shaft of a power machine;
a self-locking mechanism, comprising: a clutch tooth sleeve (10, 10"), fixedly connected with the chuck body (11) of the drill chuck, and provided with teeth (101); an oval deformation ring (09, 09"), having a substantially circular first shape and a substantially oval second shape, wherein the oval deformation ring (09, 09") has teeth (091) on side wall, with the teeth (091) of the oval deformation ring (09, 09") engaging with the teeth (101) of the clutch teeth sleeve (10, 10") when the oval deformation ring (09, 09") is in the second shape; and a control sleeve (08), for controlling the conversion of the oval deformation sleeve (09, 09") between the first shape and the second shape, wherein the clutch tooth sleeve (10") of the self-locking mechanism is formed with a handling portion at an outer surface, and the control sleeve (08) includes a handling portion (84) between the clutch tooth sleeve (10") and the connecting sleeve (04); and an intermediate sleeve (05), rotating synchronously with the connecting sleeve (04) and connected fixedly with a rear portion of the oval deformation ring (09").

2. The drill chuck according to claim 1, characterized in further comprising:

a friction ring (07), rotatably mounted between a bearing (16) of the split-body nut (12) and a support stand (112) of the chuck body (11).

3. The drill chuck according to claim 2, characterized in that the oval deformation ring (09") is provided thereon with a driving jaw (099) engaging with a tooth groove (073) of the friction ring (07), the friction ring (07) includes a key side wall (071, 072) for restricting the rotation angle of a driving key (097, 098) of the oval deformation ring (09").

\* \* \* \* \*